United States Patent Office

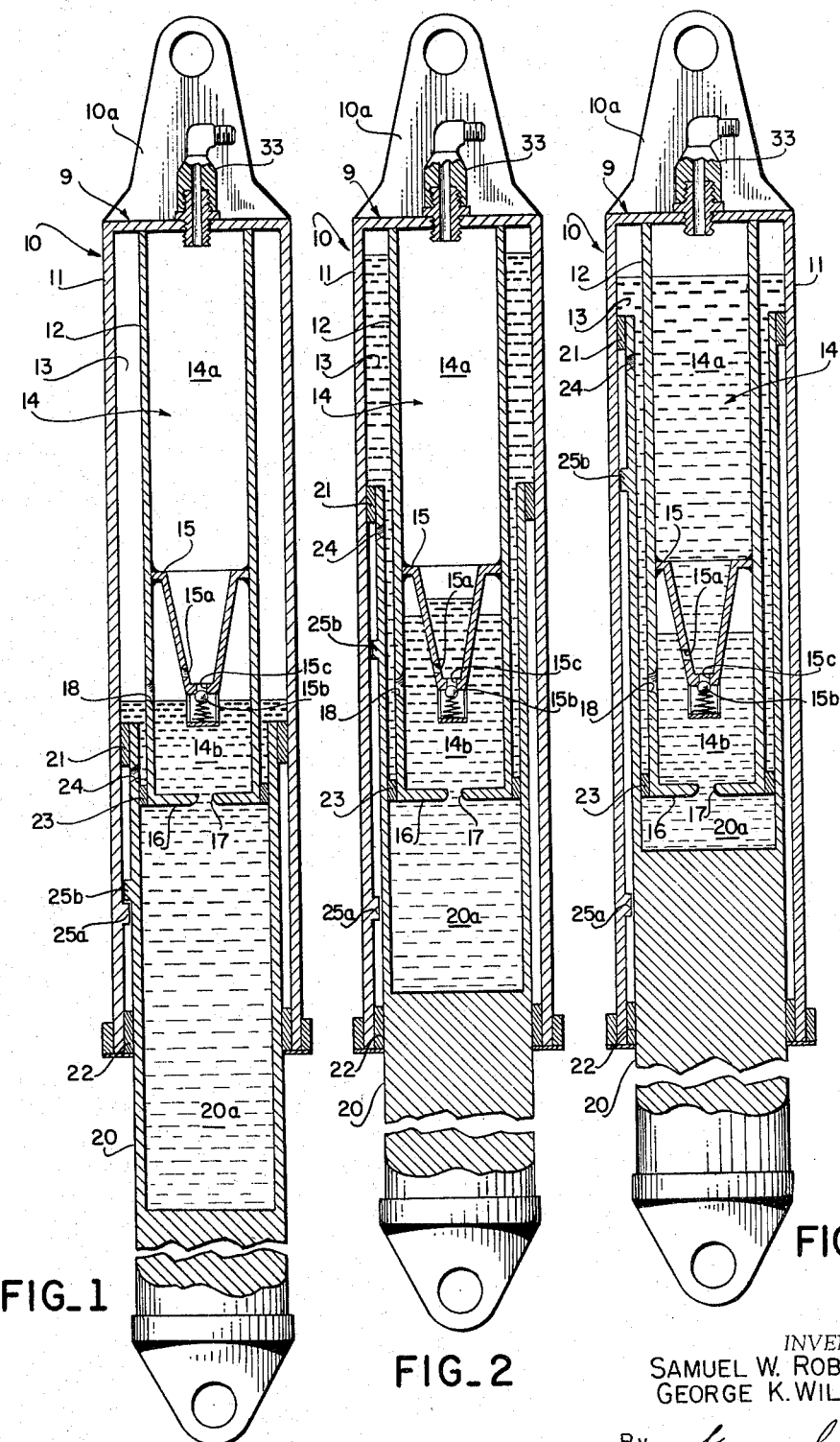

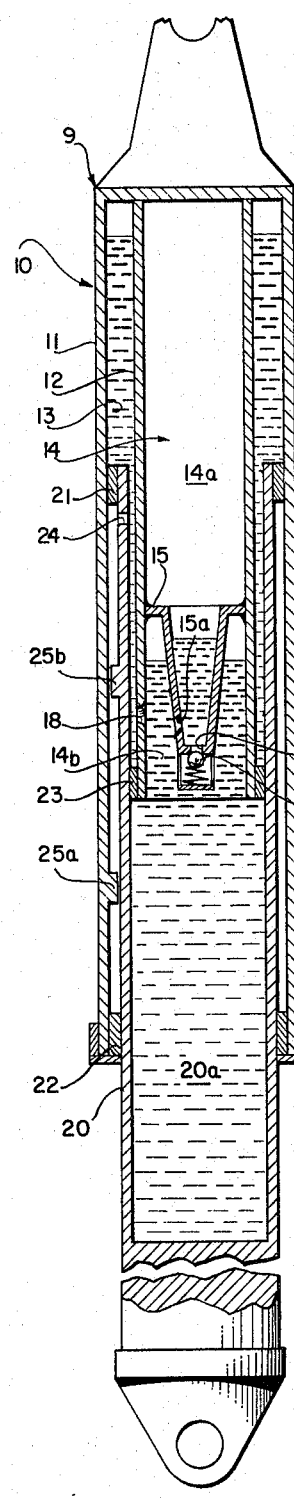

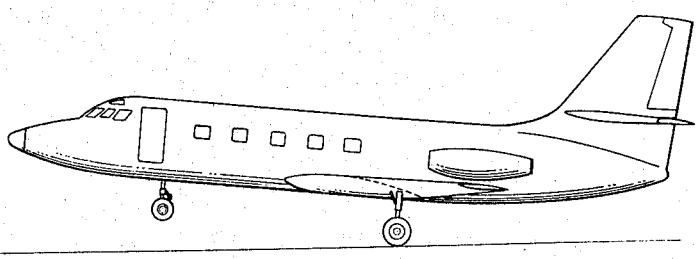
FIG_7a
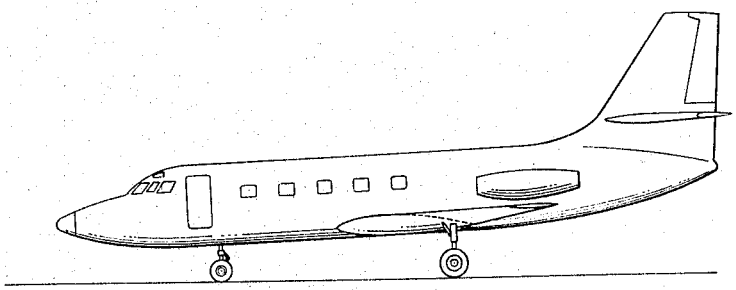
FIG_7b
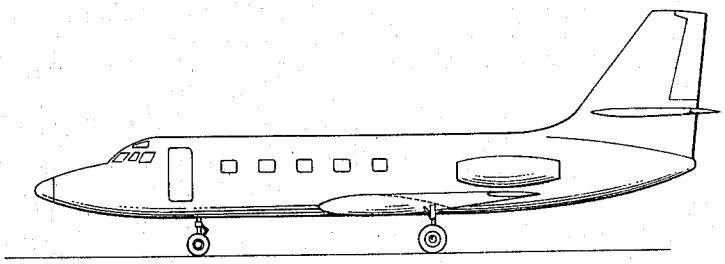
FIG_7c

3,290,037
Patented Dec. 6, 1966

---

3,290,037
MULTIPLE ORIFICE OLEO-PNEUMATIC SHOCK/STRUT
Samuel W. Robinson, Jr., Marietta, and George K. Williams, Atlanta, Ga., assignors to Lockheed Aircraft Corporation, Burbank, Calif.
Filed Nov. 13, 1964, Ser. No. 410,860
6 Claims. (Cl. 267—64)

This invention relates generally to shock struts, and more particularly to improved oleo-pneumatic struts for the landing gear of aircraft and the like, wherein the rate or amount of strut compression during the landing run and roll-out is programmed.

The streamlined configuration of modern high speed jet aircraft has resulted in fast landing speeds with relatively long landing roll-outs; therefore, the aircraft industry has taken steps to slow these landing speeds to a point where a shorter roll-out can be attained. In order to have a slow landing speed and a shorter roll-out, the aircraft is landed with a high angle of attack, that is, in a nose-up attitude. Because of this attitude, the aft portion of the aircraft fuselage is brought in close proximity with the ground upon initial impact of the aircraft with the runway. Because of this situation, it is necessary to have landing gear that holds the aircraft high off the runway. Also, after initial impact with the runway, the nose-up attitude has a tendency to cause the aircraft to bounce back into the air again in a state of flight. This situation can be avoided if the aircraft nose is immediately brought down toward the runway and to a greater degree if the nose is brought down to such an extent that the wings of the aircraft cease to have a lifting force. By the use of a greater extension of main landing gear of the aircraft relative to the nose landing gear, the aircraft can be brought in and touched down on the main gear in a nose-up attitude and after an initial impact with the runway the nose can be lowered to a substantially nose-down attitude thereby preventing any tendency of the aircraft to take off again. It is to be understood though that this particular configuration of the aircraft after landing would not be conducive to taxiing, unloading or reloading and ultimately, take-off. Accordingly, some means must be provided whereby the aircraft may be lowered relative to the ground through the main landing gear to such an extent that the aircraft will be levelled to the extent necessary for conduciveness to easy taxiing, loading operations and take-off.

Accordingly, an object of this invention is to hold the center of gravity of the aircraft in a temporary elevated position after initial impact with the runway.

Another object of this invention is to provide initial shock absorption of the aircraft impact when in initial contact with the runway and maintain clearance especially in the tail-down attitude landing, thereby providing optimum landing attitude without danger of tail damage.

A further object of this invention is to allow a slow transition in the strut of the landing gear from a tail-high aircraft attitude to the optimum level for taxiing, unloading, reloading and take-off.

Another object of this invention is to allow part of the strut stroke to be utilized in the aircraft impact absorption, and the remainder of the stroke to be utilized for a slow letdown to static equilibrium position.

A still further object of the invention is to allow for maximum aircraft aft fuselage clearance upon touchdown, and improved nose-down attitude during initial landing run thereby improving the aerodynamic characteristics during landing for minimizing the landing run.

It is still another object of the present invention to provide the above objects without changing oil levels or inflation pressures within the strut itself in an oleo-pneumatic landing gear system.

It is still a further object of the present invention to provide a lightweight, efficient, effective and reliable landing gear system.

Further objects and advantages of this invention will become apparent from the following description taken in connection with the accompanying drawings in which:

FIGURE 1 shows a cross-sectional view of the strut of this invention shown in the fully extended position;

FIGURE 2 shows a cross-sectional view similar to FIGURE 1 of a strut in the position at the end of impact of the aircraft with the runway;

FIGURE 3 is a cross-sectional view, similar to FIGURE 1, showing the strut of FIGURE 1 in the ground static equilibrium position;

FIGURE 4 shows a second embodiment of the invention in cross-section shown in a position similar to FIGURE 2;

FIGURE 5 shows a cross-sectional view of a third embodiment of the invention shown in a position similar to FIGURE 2;

FIGURE 6 is a cross-sectional view of a fourth embodiment of the invention shown in a position similar to FIGURE 2; and FIGURES 7a, 7b and 7c show the attitude of an aircraft incorporating this invention in the different stages of landing.

Referring now to the drawings, FIGURES 1, 2 and 3 show a strut 9 which comprises a cylindrical housing 11. Inside the cylindrical housing 11 is another concentric cylinder 12. The cylinders 11 and 12 define therebetween annular chamber 13. The concentric cylinders 11 and 12 comprise the cylindrical housing 10 which is adapted to be connected to the aircraft frame by any appropriate mounting means such as brackets 10a shown in FIGURE 1. The area within the inner cylinder 12 forms a chamber 14, which is divided by a frusto-conical separator or bulkhead 15 into chambers 14a and 14b. The separator 15 has a small orifice opening 15a and an axial opening 15c. The axial opening 15c is closed by a check valve 15b which will permit flow from chamber 14a into chamber 14b, but not from 14b into 14a. The bottom of inner cylinder 12 is restricted by a closure plate 16 having an orifice opening 17 therein. One or more apertures 18 are also formed in the sidewall of inner cylinder 12 permitting communication between annular chamber 13 and chamber 14b.

A hollow annular piston member 20 which is adapted to mount the wheel or bogie truck by any appropriate means, such as shown in FIGURE 1, is located for reciprocation with annular chamber 13 of the housing 10, the center portion 20a being filled with an oil or similar liquid. A bearing 21 is mounted on the outside of the annular surface of the piston 20 and cooperates with the inner surface of cylindrical wall 11. A bearing seal 22 is secured to the bottom terminal in the cylindrical wall 11 and cooperates with the outer surface of the piston 20. Another seal 23 is disposed between the exterior surface of the inner cylindrical wall 12 and the interior surface of piston 20. An orifice opening 24 is formed in piston 20 immediately beneath the bearing 21 to prevent the creation of a vacuum in the chamber bounded at opposite ends by bearings 21 and 22. This orifice opening also acts as a rebound snubber to prevent metal-to-metal impact shock loads between bearing 21 and the spacer 25a and 25b. The spacer 25a and 25b acts as a positive stop for the piston 20 in its extended position. The cylindrical housing section 10 is equipped with a plug means 33 which allows for filling the inner cylindrical chamber 14a and annular chamber 13 with air under pressure.

In operation of the shock strut upon touch-down of the aircraft while landing, the piston 20 is telescoped upwardly into chamber 13 to compress the air in chambers 14b and 13. The telescoping action of the piston 20 in the annular chamber 13 causes the oil in the center portion 20a of piston 20 to flow through the orifice 17, which oil in turn compresses the air in chamber 14b, which in turn forces oil and some air through aperture 18 compressing the air in the annular chamber 13. Impact energy is particularly dissipated by orifice 17 and aperture 18 and the remainder is absorbed by chambers 14b and 13. The double orifice chamber construction thus provides a smoother response than a conventional single orifice construction. It will be noted that upon initial touch-down, a small amount of fluid is also bled into chamber 14a through port 15a. However, port 15a is so small in comparison to orifice 17 and aperture 18, and the time interval during impact is so short that the effect of fluid leading through port 15a at this time may be disregarded for all practical purposes.

At the end of the impact stroke, the telescoping of the piston will be halted at the position shown in FIGURE 2, with the strut still extended from the ground static equilibrium position, thereby maintaining maximum ground clearance at the low point of the aft fuselage and also establishing a preferable pitch attitude for the landing run-out and deceleration of the aircraft.

At the end of the impact stroke, the hydraulic fluid continues to bleed through the port 15a at a slow rate until the pressure in chambers 14a and the combined chambers 13 and 14b equalize and the strut assumes its ground static equilibrium position as shown in FIGURE 3. It is to be further understood that if desired, the port 15a may be made adjustable so that the rate of retraction of the piston 20 may be selectively adjusted.

In the initial stages of taxiing from the ramp area out to the take-off runway the strut is in the ground static equilibrium position as shown in FIGURE 3. Taxi strip or runway roughness is absorbed in the strut by the spring action of the air in chambers 13 and 14b with the strut dampening provided by the restriction in the orifices 17 and 18.

The strut is recycled automatically while the aircraft is executing its take-off run. The take-off run will normally start with the strut in the take-off position as shown in FIGURE 3, and as the forward speed of the aircraft increases and the wing lift develops, the loads on the gear will decrease, lowering the pressure in chambers 13, 14a and 14b. Concomitantly, check valve 15b will open and hydraulic fluid will flow out of chamber 14a. By the time the aircraft has attained take-off speed, the wing lift will have picked up most of the aircraft weight and the strut will be close to the fully extended position of FIGURE 1 with little if any hydraulic fluid remaining in chamber 14a. As the plane leaves the runway, the gear will be fully extended due to the air pressure in the cylinder augmented by the weight of the unsprung portion of the gear and no hydraulic fluid will remain in chamber 14a. Thus, the strut will be in the fully extended position, which is the proper position for impact at the next landing of the aircraft.

Upon initial impact it should be noted that the tapered portion of the bulkhead 15 provides an increased resistance to the telescoping motion of piston 20 relative to housing 10. This resistance increase is due to the fact that the oil surging through the orifice 17 compresses the gas in chamber 14b which is tapered, forcing the gas in chamber 14b toward the top thereof. Since the cross-sectional area of chamber 14b decreases toward the top thereof, raising of the oil level in said chamber causes a sharp pressure rise therein which pressure rise results in a sharp resistance to the thrust of the piston 20. The combination of chambers 14b and annular chamber 13 provides the function of allowing the strut to be compressed at first, in a comparatively uninhibited manner whereby pressures in chambers 14b and 13 are substantially equal and increase in proportion to the degree of insertion of piston 20 in annular area 13. However, when the oil level covers aperture 18, it can be seen that the frusto-conical shape of the separator bulkhead 15 will cause the beginning of a sharp pressure rise within the chamber 14b. During the pressure rise the aperture 18 will allow oil to communicate from chamber 14b to annular chamber 13. The combined shapes of chambers 14b and 13 will allow for a rather straight line pressure rise until aperture opening 18 is covered with oil whereupon the continued rising of the oil will cause a sharper air pressure increase in chamber 14b and accordingly a sharper resistance to the retraction of the piston 20 within the annular area 13.

Referring now to FIGURE 4, this embodiment shows bulkhead 15 being disposed immediately above the aperture 18 and the orifice plate 16 being eliminated. The principal advantage of this configuration is the lighter weight due to the elimination of the orifice plate 16. Because of the absence of the orifice opening 17, the aperture 18 will have to be adjusted in size accordingly to compensate for that function lost by the absence of the orifice 17. It should be noted, however, that the advantage of the cushioning effect of the chamber 14b is retained in the modification of FIGURE 4.

A second alternate embodiment of the shock strut is shown in FIGURE 5. In this embodiment the small orifice opening 15a is replaced by a remotely controlled valve 40. By this modification the strut piston 20 may be held in an extended position throughout the landing run-out and taxiing to the ramp thereby affording the pilot better ground visibility and clearance at aft fuselage. After the airplane is parked at the ramp, the piston 20 could be retracted by actuating the valve 40. Recycling the strut would be the same as in the preferred embodiment since the check valve would operate in the manner disclosed therein.

Referring now to FIGURE 6, the strut is shown in its partially retracted position, which strut comprises a cylindrical housing section 63 which is adapted to be connected to the aircraft frame. The cylinder section 63 has two cylinder walls 64 and 65 which form chambers 66 and 67. An orifice opening 65a is formed in the bottom of cylinder wall 65 which communicates chamber 67 with 66 and an orifice or separator 68 having an opening 68a therein is secured to the bottom of cylinder wall 65 forming another chamber 69 beneath chamber 67. A hollow annular piston member 70 which mounts the aircraft wheels is mounted for reciprocation within annular chamber 66 of the housing 63. Also, a metering pin 71 is secured to the piston 70 and extends through the opening 68a in the orifice plate 68 forming an orifice of the opening. It should be noted that metering pin 71 is gradually tapered, having a larger cross-sectional area at the base thereof than at the tip. Accordingly, as the landing gear strut is compressed, the metering pin 71 will cause the port opening 68 to become smaller as the strut is retracted. A diaphragm or bulkhead 72 may be appropriately located in piston 70 to reduce the volume of oil required by operating the strut.

The lower portion of chamber 67 is filled with oil while air under pressure is inserted in the upper portion of chamber 67 through inlet valve 73; the pressure of the air-foil in chamber 67 acting against bulkhead 72 to extend the strut. Upon landing the aircraft, the piston 70 is telescoped upwardly into annular chamber 66, whereby the oil in chamber 69 is forced through orifice opening 68a into chamber 67. Impact energy is substantially entirely dissipated by orifice 68a with some small amount being dissipated through orifice 65a; and during impact absorption, part of the available strut stroke is utilized. It will, of course, be appreciated that the metering pin 71 is of tapered configuration to obtain the desired orifice restriction opening during initial impact and subsequent deflected positions of the strut during ground maneuvering of the aircraft. At the end of the impact stroke the hydraulic fluid continues to bleed from chamber 67 into chamber 66 through orifice opening 65a at a slow rate thus utilizing part of the stroke for a slow let-down as before until the pressure in chambers 67 and 66 equalizes, whereupon the strut reaches a state of ground static equilibrium or position.

Such construction provides for the dissipation of impact energy of the aircraft by passing oil from a first chamber through a variable size orifice opening into a second chamber and the subsequent slow dissipation of energy by passing oil from the second chamber into a third chamber through appropriate orificed communication until a static equilibrium condition is obtained.

This new and novel method of a metered retraction of a piston into a chamber is provided by the use of one or more orifices of predetermined size.

The advantages provided by this invention can be demonstrated by FIGURES 7a, 7b and 7c, wherein 7a shows the aircraft utilizing the invention in its approach to the runway, whereby the main landing gear is in its extended position. It can be seen that the pilot of the aircraft will be able to approach the runway in an extreme nose-up tail-down position, and still maintain substantial clearance between the surface of the runway and the tail section of the aircraft. This is, of course, due to the extended position of the landing gear assembly and further to the fact that the landing gear assembly after initial impact will be compressed only a portion of its available stroke. FIGURE 7b shows the attitude of the aircraft after initial impact, wherein the aircraft will be in a nose-down position. This nose-down attitude enables the pilot of the aircraft to achieve a negative angle of attack to the relative oncoming wind, thereby enhancing the ability of the aircraft to remain on the runway even while maintaining a speed sufficient for flight. Because of this negative angle of attack the lift on the aircraft wings is lost and the weight of the aircraft, instead of being supported by the wings, is being supported by the wheels. This enables the pilot to use the brakes of the wheels to help slow down and control the aircraft even when the aircraft is still at flight speed. Furthermore, because of the negative angle of attack, greater aircraft profile drag is presented to assist in slowing the aircraft during the first stages of roll-out.

FIGURE 7c shows the attitude of the aircraft after a ground static equilibrium position is reached in the strut assembly. It should be noted that the aircraft in this attitude is level and at a loading and unloading height, and in the take-off position.

It should be further noted that, since the aircraft is able to approach the runway at an extreme nose-high position as shown in FIGURE 7a, optimum use of flaps, and other equipment of the aircraft can be employed and that the aircraft will be able to make its approach close to stall speed without danger to the tail section upon landing impact.

While particular embodiments of the invention have been illustrated and described, it will be obvious to those skilled in the art that various changes and modifications may be made without departing from the invention and it is intended to cover in the appended claims all such modifications and equivalents as fall within the true spirit and scope of this invention.

What is claimed is:

1. A telescoping shock absorber strut for a vehicle comprising: an outer cylinder adapted for attachment to a vehicle and having a concentric inner cylinder therein containing at least one sidewall aperture therethrough, said inner and outer cylinders being closed at one end and defining an annular area therebetween; an intermediate cylinder for attachment to the vehicle ground contacting members, said intermediate cylinder being associated with said outer and inner cylinders so as to be telescopically received therebetween and making said annular area an annular chamber; orificed end closure means at the other end of said inner cylinder; a bulkhead located within said inner cylinder dividing said inner cylinder into first and second chambers with said inner cylinder sidewall aperture located in the second chamber intermediate said bulkhead and said end closure means; and a third chamber defined by said inner cylinder end closure means and said intermediate cylinder, said third chamber being filled with liquid whereupon when said intermediate cylinder is telescopically inserted into an annular area the liquid in said third chamber is forced through said orifice into said second chamber against said bulkhead and through said sidewall aperture into said annular chamber.

2. A telescoping shock absorber strut for a vehicle comprising: an outer cylinder adapted for attachment to a vehicle and having a concentric inner cylinder therein containing at least one sidewall aperture therethrough, said inner and outer cylinders being closed at one end and defining an annular area therebetween; an intermediate cylinder for attachment to the vehicle ground contacting members, said intermediate cylinder being associated with said outer and inner cylinders so as to be telescopically received therebetween and making said annular area an annular chamber; orificed end closure means at the other end of said inner cylinder; a bulkhead located within said inner cylinder dividing said inner cylinder into first and second chambers with said inner cylinder sidewall aperture located in the second chamber intermediate said bulkhead and said end closure means; said bulkhead defining a constantly open port and a closable port communicating said first and second chambers wherein a restricted flow can be maintained from the second chamber to the first chamber and a substantially unrestricted flow can be maintained from the first chamber to the second chamber; and a third chamber defined by said inner cylinder end closure means and said intermediate cylinder, said third chamber being filled with liquid whereupon when said intermediate cylinder is telescopically inserted into said annular area the liquid in said third chamber is forced through said orifice into said second chamber against said bulkhead and through said sidewall aperture into said annular chamber.

3. A telescoping shock absorber strut for a vehicle comprising: an outer cylinder adapted for attachment to a vehicle and having a concentric inner cylinder therein containing at least one sidewall aperture therethrough, said inner and outer cylinders being closed at one end and defining an annular area therebetween; an intermediate cylinder for attachment to the vehicle ground contacting members, said intermediate cylinder being associated with said outer and inner cylinders so as to be telescopically received therebetween and making said annular area an annular chamber; orificed end closure means at the other end of said inner cylinder; a bulkhead located within said inner cylinder dividing said inner cylinder into first and second chambers with said inner cylinder sidewall aperture located in the second chamber intermediate said bulkhead and said end closure means; both said annular chamber and said second chamber being at least partially filled with pressurized air; and a third chamber defined by said inner cylinder end closure means and said intermediate cylinder, said third chamber being filled with liquid whereupon when said intermediate cylinder is telescopically inserted into said annular area the liquid in said third chamber is forced through said orifice into said second chamber and through said sidewall aperture into said annular chamber for further pressurization of said pressurized air.

4. A telescoping shock absorber strut assembly comprising: an outer cylinder; an inner cylinder in said outer cylinder and concentric therewith; said inner and outer cylinders closed at one end to define an annular area therebetween; orificed end closure means at the other end of said inner cylinder; orificed separator means located within said inner cylinder and dividing said inner cylinder into a first and second chamber communicating therebetween through said orifice arrangement in said separator means; an intermediate cylinder having an open end and a cylinder closure means remote from said open end, said open end of the intermediate cylinder located within said annular area between said inner and outer cylinders to serve as a piston means within said annular area whereby said intermediate cylinder is telescopically movable relative to said inner and outer cylinders; and at least one orifice in the sidewall of the inner cylinder providing communication between the annular area and the inner cylinder chamber portion defined by said inner cylinder end closure means and said inner cylinder separator means.

5. The telescoping shock absorber strut assembly of claim 4 in which said orificed separator means includes a first orifice means that is adjustable to vary the orifice from complete closure to full open for variable communication between said inner cylinder first and second chambers; and a second orifice means adapted for communication between said inner cylinder first and second chambers in one direction only.

6. A telescoping shock absorber strut assembly comprising: an outer cylinder; an inner cylinder in said cylinder and concentric therewith; said inner and outer cylinders closed at one end to define an annular area therebetween; orificed end closure means at the other end of said inner cylinder; an intermediate cylinder having an open end and a cylinder closure means remote from said open end, said open end of the intermediate cylinder located within said annular area between said inner and outer cylinders to serve as a piston means within said annular area whereby said intermediate cylinder is telescopically movable relative to said inner and outer cylinders; a tapered metering means mounted on said cylinder closure means of the intermediate cylinder and extending longitudinally within said intermediate cylinder, said tapered metering means extending through the orifice of the inner cylinder end closure means whereupon the effective area of said orifice becomes varied upon movement of the intermediate cylinder relative to said inner and outer cylinders; and at least one orifice in the sidewall of the inner cylinder providing communication between the annular area and the inner cylinder interior.

References Cited by the Examiner
UNITED STATES PATENTS

| | | | |
|---|---|---|---|
| 2,814,482 | 11/1957 | Anderson et al. | 244—104 |
| 2,856,143 | 10/1958 | Westcott | 244—104 |
| 2,958,485 | 11/1960 | Eldred | 244—104 |
| 3,177,981 | 4/1965 | Porter | 267—1 |

ARTHUR L. LA POINT, *Primary Examiner.*

MILTON BUCHER, *Examiner.*

R. M. WOHLFARTH, *Assistant Examiner.*